US006862316B2

United States Patent
Tomisato et al.

(10) Patent No.: US 6,862,316 B2
(45) Date of Patent: Mar. 1, 2005

(54) SPATIAL AND TEMPORAL EQUALIZER AND EQUALIZATION METHOD

(75) Inventors: Shigeru Tomisato, Yokohama (JP); Tadashi Matsumoto, Ebina (JP)

(73) Assignee: NTT DoCoMo, Inc., Tokyo (JP)

( * ) Notice: Subject to any disclaimer, the term of this patent is extended or adjusted under 35 U.S.C. 154(b) by 825 days.

(21) Appl. No.: 09/817,348

(22) Filed: Mar. 27, 2001

(65) Prior Publication Data

US 2001/0026197 A1 Oct. 4, 2001

(30) Foreign Application Priority Data

Mar. 27, 2000 (JP) ........................................ 2000-085778

(51) Int. Cl.[7] .......................... H03H 7/30; H03H 7/40; H03K 5/159
(52) U.S. Cl. ....................... 375/232; 375/233; 375/349; 375/350; 455/306; 455/273; 455/276.1
(58) Field of Search ................................ 375/229–233, 375/144, 148, 346, 347, 349, 350, 285; 455/303–306, 137, 272, 273, 276.1; 342/378, 381

(56) References Cited

U.S. PATENT DOCUMENTS

| | | | | |
|---|---|---|---|---|
| 5,646,958 A | * | 7/1997 | Tsujimoto | 375/233 |
| 5,689,528 A | * | 11/1997 | Tsujimoto | 375/233 |
| 5,870,430 A | * | 2/1999 | Pipon et al. | 375/229 |
| 6,115,409 A | * | 9/2000 | Upadhyay et al. | 375/144 |
| 6,118,832 A | * | 9/2000 | Mayrargue et al. | 375/346 |
| 6,166,689 A | * | 12/2000 | Dickey et al. | 342/381 |
| 6,240,098 B1 | * | 5/2001 | Thibault et al. | 370/431 |
| 6,243,412 B1 | * | 6/2001 | Fukawa | 375/219 |
| 6,243,415 B1 | * | 6/2001 | Pipon et al. | 375/232 |
| 6,317,467 B1 | * | 11/2001 | Cox et al. | 375/267 |
| 6,714,584 B1 | * | 3/2004 | Ishii et al. | 375/148 |

FOREIGN PATENT DOCUMENTS

| | | |
|---|---|---|
| EP | 0 604 956 | 7/1994 |
| WO | WO 97/44855 | 11/1997 |

OTHER PUBLICATIONS

Maw–Lin Leou, et al., IEEE Transactions on Vehicular Technology, vol. 49, No. 1, XP—000951729, pp. 1–10, "A Novel Hybrid Of Adaptive Array And Equalizer For Mobile Communications", Jan. 2000.

* cited by examiner

*Primary Examiner*—Phuong Phu
(74) *Attorney, Agent, or Firm*—Oblon, Spivak, McClelland, Maier & Neustadt, P.C.

(57) ABSTRACT

Outputs from respective elements of an array antenna 21 are demodulated, and the demodulated outputs are stored in storage means 29. The demodulated outputs are multiplied by tap coefficients of adaptive array antenna, then the multiplied outputs are combined by combining means 28, and the combined output is provided via a feed forward filter 22 to an adaptive equalizer 23, wherein it is equalized to obtain a decision symbol. During reception of a training signal the tap coefficients of adaptive array antenna and tap coefficients of the adaptive equalizer 23 are subjected to convergence processing by tap coefficient calculating means 24 so that an error signal becomes small, and then tap coefficients of the feed forward filter 22 and the adaptive equalizer 23 are subjected to convergence processing by tap coefficient calculating means 25 so that an error signal becomes small. Thereafter, the convergence processing by the means 24 and 25 is repeated, during which a training signal stored in storage means 29 is used, results of the immediately preceding convergence processing are used as initial values, and it is decided by receiving quality estimating means 26 whether the error signal has become sufficiently small relative to the received signal power.

16 Claims, 10 Drawing Sheets

FIG. 10
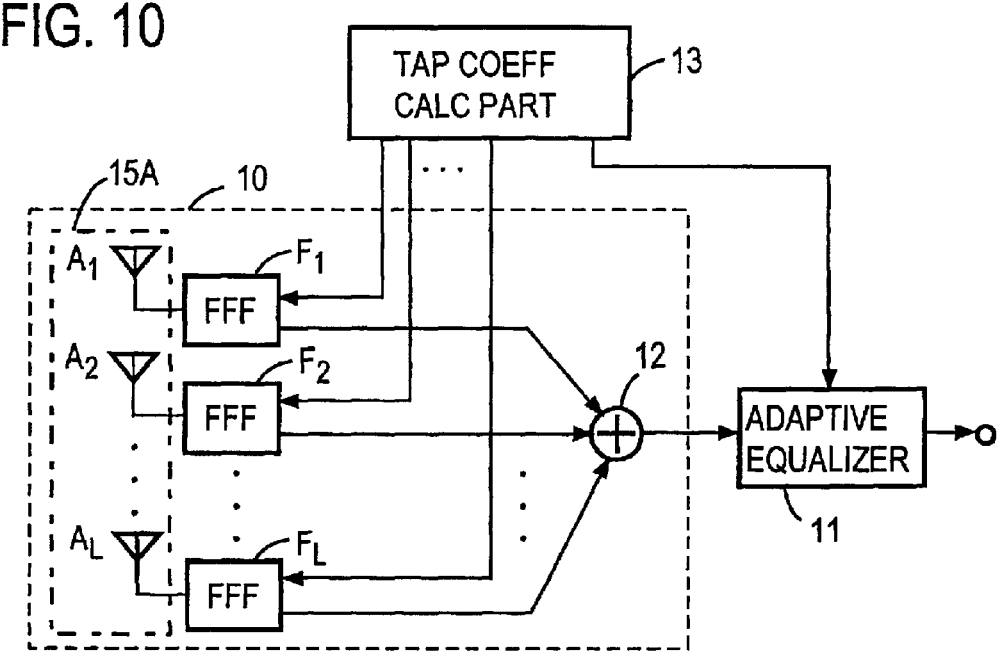
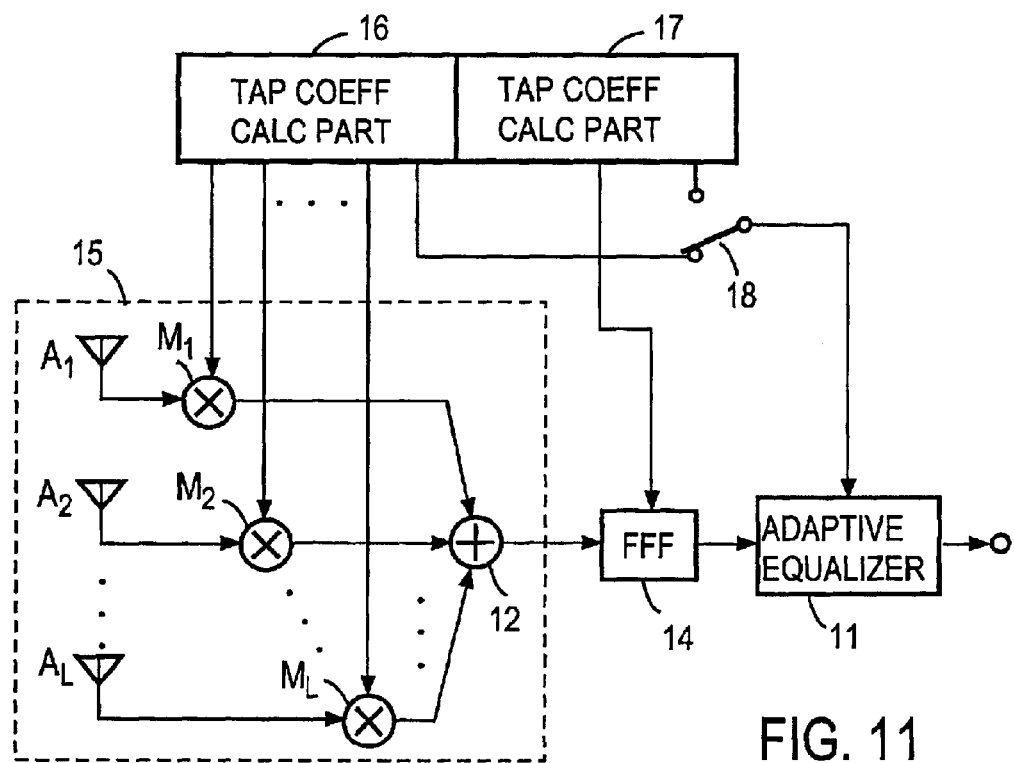
FIG. 11

SPATIAL AND TEMPORAL EQUALIZER AND EQUALIZATION METHOD

BACKGROUND OF THE INVENTION

The present invention relates to a spatial and temporal equalizer that is a hybrid of an adaptive array antenna and an adaptive equalizer for mobile communications, and a spatial and temporal equalization method.

The adaptive array antenna and the adaptive equalizer are effective in removing interference in mobile communications. The adaptive array antenna adaptively generates a beam pattern (a directional pattern) in which a beam of a relatively high antenna gain (the main lobe of the directional pattern) is directed toward the wave desired to receive and null of the directional pattern, for which the antenna gain is significantly low, are directed toward interference waves such as signals from other users. The adaptive array antenna performs spatial signal processing and is an effective means for eliminating interference waves of the same channel as that of the desired waves, that is, cochannel interference.

The adaptive equalizer has been used to eliminate multipath waves that are desired waves but delayed behind them, that is, intersymbol interference. The spatial and temporal equalizer is a combination of the adaptive array antenna and the adaptive equalizer.

In FIG. 10 there is depicted a conventional spatial and temporal equalizer disclosed, for example, in Saito et al., "A Study of a split channel estimation scheme for the Spatial and Temporal Equalizer," Technical Report of IEICE, DSP99-178, SAT99-133, RCS99-183 (2000-01), pp. 25–30 (hereinafter referred to as Literature 1), and Fukawa, "A cascading Connection of Adaptive Array and MLSE Detector and its Performances," Technical Report of IEICE, A-p97–146 (1997-11), pp. 85–92 (hereinafter referred to as Literature 2). In this prior art example, respective elements $A_1, A_2, \ldots, A_L$ of an adaptive antenna 10 are equipped with feed forward filters $F_1, F_2, \ldots, F_L$ for compensating for symbol timing offset. Symbol timing offset from the received signal will often degrade the characteristics of an adaptive equalizer 11, but this can be avoided by the provision of the feed forward filters $F_1$ to $F_L$. It is necessary that taps of a transversal filter forming each of the feed forward filters $F_1$ to $F_L$ be set at shorter time intervals than the transmission symbol period T, usually at T/2 time intervals. The outputs from the feed forward filters $F_1$ to $F_L$ are combined by a combiner 12, thereafter being fed to the adaptive equalizer 11. In the illustrated spatial and temporal equalizer, tap coefficients of the feed forward filters F1 to FL connected to the antenna elements A1 to AL of an adaptive array 15A and the adaptive equalizer 11 are all simultaneously calculated and set by tap coefficient calculating part 13. Accordingly, the tap coefficients can be converged to optimum values as a whole. To perform this, it is customary to use what is called a training signal for which the transmission symbol pattern is known at the receiving side. With the configuration of FIG. 10, the total number of taps of the feed forward filters $F_1$ to $F_L$ is so large that the computational complexity for the tap coefficient calculation by the tap coefficient calculating part 13 increases, giving rise to the problem of extended time of convergence of the tap coefficients.

Literature 1 also discloses a simplified version of the spatial and temporal equalizer of FIG. 10. FIG. 11 depicts such a simplified configuration that is intended to reduce the total number of taps used. As shown in FIG. 11, in this equalizer the feed forward filters $F_1$ to $F_L$ are not provided, but instead the outputs from the antenna elements $F_1$ to $F_L$ are multiplied by weights (tap coefficients) by multipliers $M_1$ to $M_L$ and the multiplied outputs are combined by the combiner 12 and provided via one feed forward filter 14 to the adaptive equalizer 11. That is, the feed forward filter 14 is provided between the combiner 12 and the adaptive equalizer 11, and the multipliers $M_1$ to $M_L$ are connected to the antenna elements $A_1$ to $A_L$ to complex-multiply their outputs by weights (tap coefficients) to control the phases and amplitudes of received signals. With this arrangement, however, in the case of estimating all the tap coefficients at the same time, no sufficient convergence can be achieved since the tap coefficients for the multipliers $M_1$ to $M_L$ of the adaptive array antenna 10 and the tap coefficients of the feed forward filter 14 are provided in the form of product. Accordingly, the tap coefficients are calculated separately.

To start with, the weights (tap coefficients) for the adaptive array antenna 10 and the tap coefficients of the adaptive equalizer are simultaneously converged by tap coefficient calculating part 16 using the first half period of the training signal. In this case, tap coefficients of the feed forward filter 14 are set by tap coefficient calculating part 17 so that the transfer function of the filter 14 is 1, that is, the filter 14 simply passes signals. Next, the tap coefficients of the feed forward filter 14 and the adaptive equalizer 11 are simultaneously converged by the tap coefficient calculating part 17 using the second half period of the training signal. Accordingly, the tap coefficients are set in the adaptive equalizer 11 by the tap coefficient calculating part 16 or 17 that are switched by a switch 18 as required.

In either of the configurations of FIGS. 10 and 11, the tap coefficients are calculated so that the adaptive array antenna 10 eliminates spatially different interference waves of other users and long-delayed waves that the adaptive equalizer 11 cannot equalize and the adaptive equalizer 11 processes short-delayed waves which are equalizable in the time domain, such as intersymbol interference.

In the FIG. 10 example for batch processing as mentioned above, since each element of the adaptive array antenna 10 has the feed forward filter FFF, an increase in the number of antenna elements causes a dramatic increase in the total number of taps, and computational complexity increases accordingly. This constitutes a serious obstacle to forming the spatial and temporal equalizer by hardware, and hence makes it impossible to implement the equalizer. Further, since the convergence of the tap coefficients requires a long training signal period, the transmission efficiency is appreciably low.

With the scheme of FIG. 11, separate convergence of the tap coefficients of the adaptive array antenna 10, the feed forward filter 14 and the adaptive equalizer 11 does not always provide optimum convergence results, and the receiving characteristic is lower than in the case of batch processing. Besides, since the feed forward filter 14 is in the simply-pass state during the tap coefficient convergence of the adaptive array antenna 10, no sufficient convergence can be achieved if symbol timing offset occurs.

SUMMARY OF THE INVENTION

It is therefore an object of the present invention to provide a spatial and temporal equalizer that permits optimum convergence of tap coefficients without significantly increasing computational complexity, and an equalization method therefor.

The spatial and temporal equalizer according to the present invention comprises:

an adaptive array antenna which complex-multiplies array antenna output signals from an array antenna composed of L elements by tap coefficients of adaptive array antenna to control the amplitudes and phases of received signals, and combines the multiplied output signals into an array antenna composite signal, said L being an integer equal to or greater than 2;

a feed forward filter comprising a transversal filter of N taps respectively supplied with tap coefficients of feed forward filter, for receiving the array antenna composite signal and outputting signals of the N taps as a first tap input signal, and a filtering output signal, said N being an integer equal to or greater than 2;

an adaptive equalizer which has an adaptive equalization circuit of M taps each weighted by an adaptive equalization weighting factor, for simulating a propagation path characteristic, outputs, as a second tap input signal, signals from the M taps of the adaptive equalization circuit supplied with symbol sequences, and outputs an estimation error signal for a received symbol based on the output from the adaptive equalization circuit and a decided symbol signal;

first tap coefficient calculating means for calculating the tap coefficients of adaptive array antenna and the tap coefficients of adaptive equalizer from the array antenna output signals, the second tap input signal and the estimation error signal;

second tap coefficient calculating means for calculating the tap coefficients of feed forward filter and the tap coefficients of adaptive equalizer from the first and second tap input signals and the estimation error signal;

tap coefficient select means for selectively outputting either the tap coefficients of adaptive equalizer from the first tap coefficient calculating means or the tap coefficients of adaptive equalizer from the second tap coefficient calculating means; and receiving quality estimating means for causing the first and second tap coefficient calculating means to repeat their convergence operation until it is estimated that the receiving quality has reached a desired level.

The spatial and temporal equalization method according to the present invention comprises the steps of:

(a) calculating tap coefficients of adaptive array antenna and tap coefficients of adaptive equalizer based on received signals from array antennas and a first tap input signal and an estimation error signal from said adaptive equalizer;

(b) calculating tap coefficients of feed forward filter and the tap coefficients of adaptive equalizer from a second tap input signal provided from tap outputs of the feed forward filter, the first tap input signal and the estimation error signal;

(c) calculating an estimation error in the adaptive equalizer through the use of the tap coefficients of adaptive array antenna, the tap coefficients of feed forward filter and the tap coefficients of adaptive equalizer calculated by said steps (a) and (b); and (d) deciding whether the estimation error is smaller than a predetermined value, and if not, repeating said steps (a) and (b).

Alternatively, in said step (c) no estimation error is calculated, and a check is made to see if the number of repetitions of said steps (a) and (b) has reached a predetermined value larger than 2, and if the predetermined number of times is reached in said step (d), the processing is terminated.

With the provision of the receiving quality estimating means, it is possible to decide whether the tap coefficients are sufficiently converged, and hence the convergence operation can be conducted until the tap coefficients are sufficiently converged.

BRIEF DESCRIPTION OF THE DRAWINGS

FIG. 10 is a diagram depicting a conventional spatial and temporal equalizer; and FIG. 11 is a diagram depicting another conventional spatial and temporal equalizer.

DETAILED DESCRIPTION OF THE PREFERRED EMBODIMENTS

First Embodiment

Figure 1:
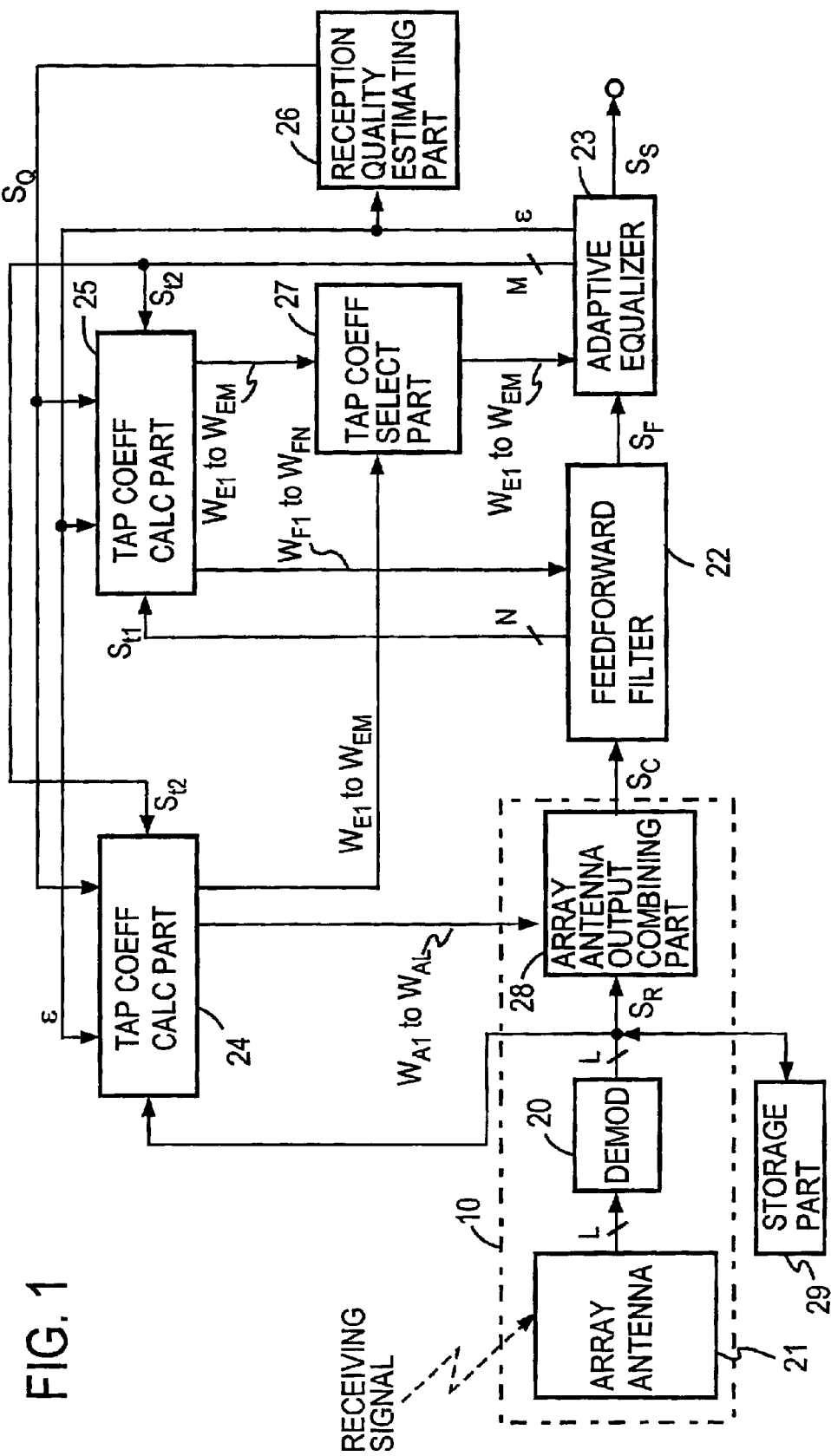
FIG. 1 is a block diagram illustrating the functional configuration of a first embodiment of the present invention.

FIG. 1 illustrates in block form a first embodiment of the spatial and temporal equalizer according to the present invention, which is an improvement of the prior art described previously with reference to FIG. 11. Hence, the equalizer of this embodiment basically includes an adaptive array antenna 10, a feed forward filter 22, an adaptive equalizer 23 and tap coefficient calculating parts 24 and 25 as is the case with the FIG. 11 prior art example. An array antenna 21 in the adaptive antenna array 10 corresponds to the antenna elements $A_1$ to $A_L$ in FIG. 11, and array antenna output combining part 28 corresponds to the multipliers $M_1$ to $M_L$ in FIG. 11 as described later on with respect to FIG. 2. The feed forward filter 22, the adaptive equalizer 23, and the tap coefficient calculating parts 24 and 25 correspond to the feed forward filter 14, the adaptive equalizer 11 and the tap coefficient calculating parts 16 and 17, respectively, in FIG. 11.

The spatial and temporal equalizer according to this embodiment is newly provided with reception quality estimating part 26. To separately calculate the tap coefficients, tap coefficient select part 27 temporally switches between the respective tap coefficient calculating parts 24 and 25 so that tap coefficients of adaptive equalizer calculated therein are selectively set in the adaptive equalizer 23.

Figure 2:
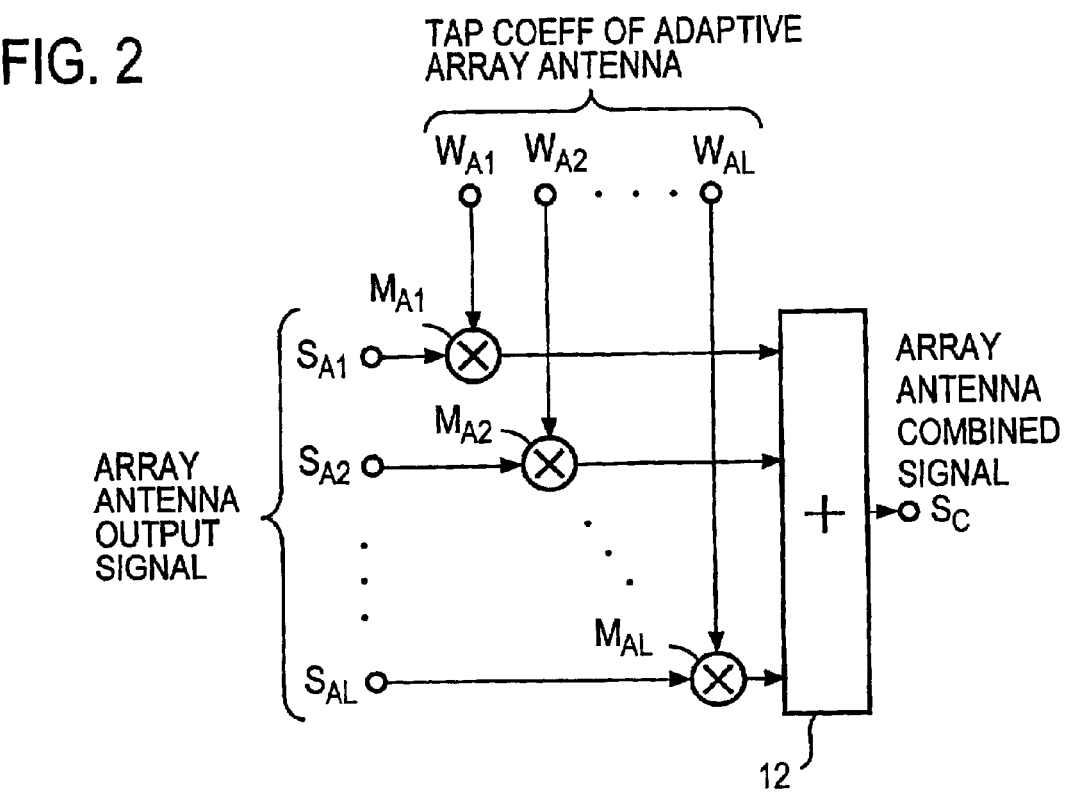
FIG. 2 is a diagram depicting an example of array antenna output signal combining part 28 in FIG. 1.

The received signal is received by the array antenna 21 composed of L (where L is an integer equal to or greater than 2) elements, from which the received signal is provided as L sequences of array antenna output signals. These output signals are demodulated by L demodulators 20 in this embodiment. The demodulated signals $S_R$ are fed to array antenna output combining part 28. FIG. 2 depicts an example of the array antenna output combining part 28. The L sequences of array antenna output signals $S_{A1}$ to $S_{AL}$ input to the combining part 28 are complex-multiplied by tap coefficients of adaptive array antenna $W_{A1}$ to $W_{AL}$ in multipliers $M_{A1}$ to $M_{AL}$, respectively. These multiplied signals are combined by an array antenna output combiner 12 into an array antenna combined signal $S_C$.

Figure 3:
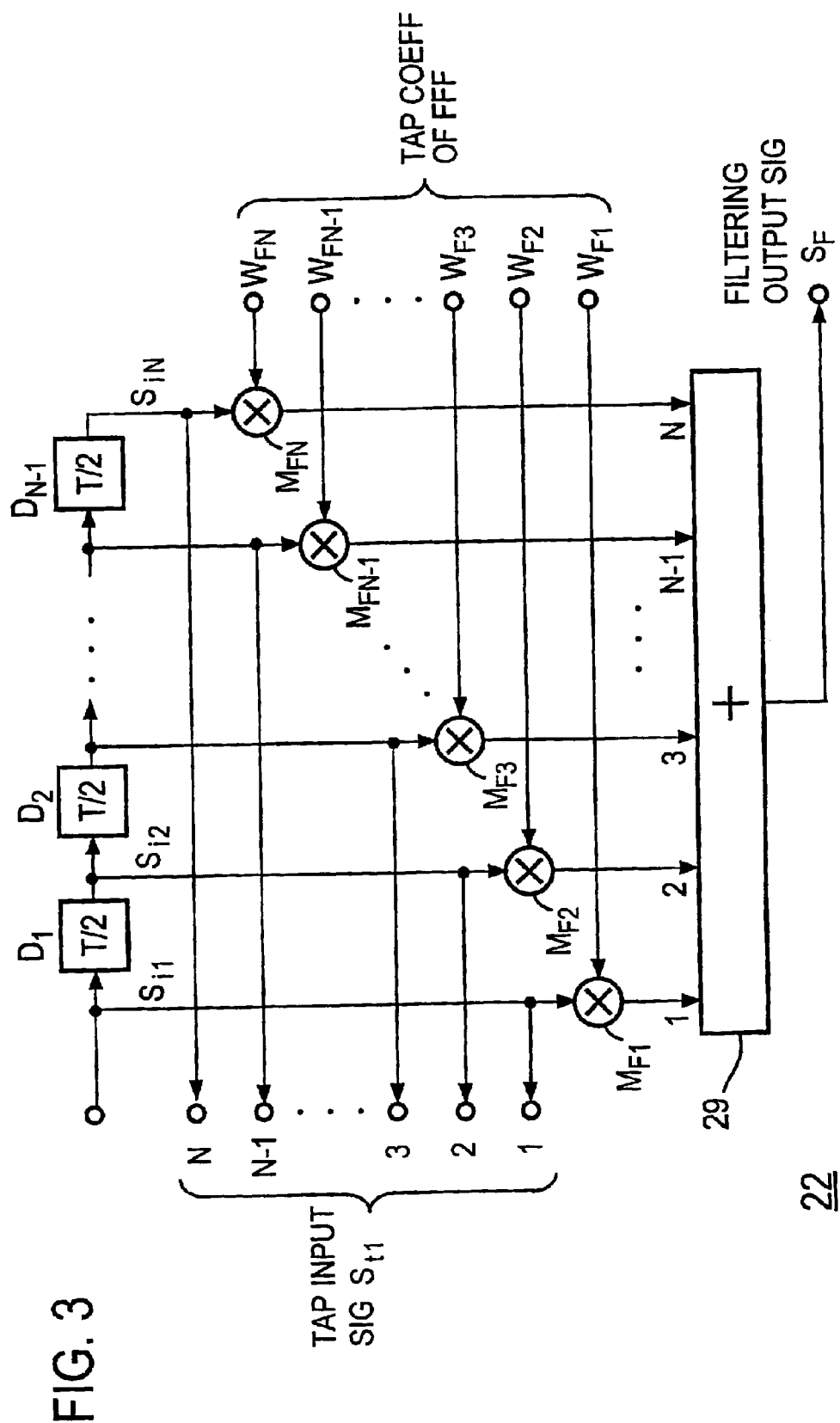
FIG. 3 is a diagram depicting an example of a feed forward filter 22 in FIG. 1.

The array antenna combined signal $S_C$ is input to the feed forward filter 22. FIG. 3 depicts an example of the feed forward filter 22. The array antenna combined signal $S_C$ is fed to a series circuit of unit delay elements $D_1$ to $D_{N-1}$. The delay time of each unit delay element is set to ½ of the symbol transmission period T in this example. In the feed forward filter 22, input and output signals $S_{i1}$ to $S_{iN}$ of the delay elements $D_1$ to $D_{N-1}$ are complex-multiplied by tap coefficients of feed forward filter $W_{F1}$ to $W_{FN}$ in multipliers $M_{F1}$ to $M_{FN}$, respectively, and the multiplied outputs are combined by combiner 29 into a filtering output signal $S_F$. That is, the feed forward filter 22 is formed by an N-tap (where N is an integer equal to or greater than 2) transversal filter. The delay element input/output signals $S_{i1}$ to $S_{iN}$ are provided as a tap input signal $S_{t1}$ to the tap coefficient calculating part 25.

Figure 4A:
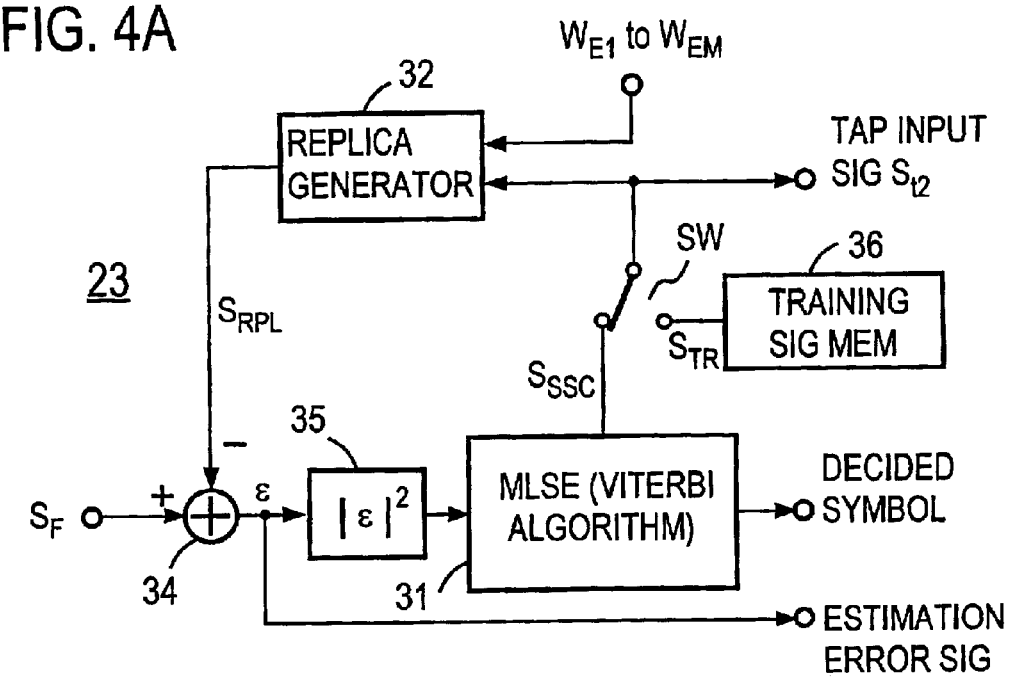
FIG. 4A is a diagram showing an example of an adaptive equalizer 23 in FIG. 1.
Figure 4B:
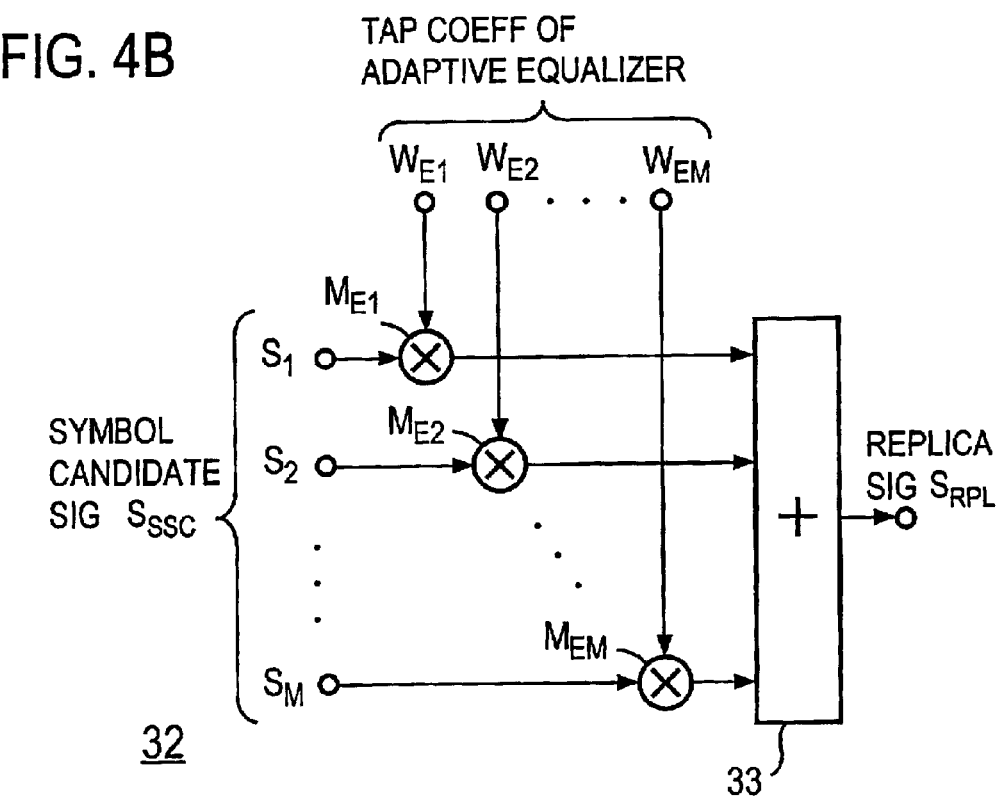
FIG. 4B is a diagram depicting an example of a replica generator 32 in FIG. 4A.

Supplied with the filtering output signal $S_F$ as the input thereto, the adaptive equalizer performs the equalization process. FIG. 4A depicts an example of the adaptive equalizer 23. The illustrated configuration is called MLSE type and intended for the Maximum Likelihood Sequence Estimation. In the adaptive equalizer 23, symbol sequence candidate signals $S_{SSC}=\{S_1, \ldots, S_M\}$ of the received signal are provided from a maximum likelihood estimator 31, and in a replica generator 32 the symbol sequence candidate signals $S_{SSC}$ are complex-multiplied by tap coefficients of adaptive equalizer $W_{E1}$ to $W_{EM}$, respectively. That is, as depicted in FIG. 4B, the replica generator 32 complex-multiplies the input symbol sequence candidate signals $S_{SSC}=\{S_1, \ldots, S_M\}$ by the tap coefficients of adaptive equalizer $W_{E1}$ to $W_{EM}$ in multipliers $M_{E1}$ to $M_{EM}$, respectively, and the multiplied outputs are combined by a combiner 33 into a replica signal $S_{RPL}$ of the received signal. Thus, the adaptive equalizer 23 uses, as the replica generator 32, an M-tap (where M is an integer equal to or greater than 1) transversal filter.

In the illustrated example of the adaptive equalizer 23 the symbol sequence candidate signals $S_{SSC}$ is provided as a tap input signal $S_{t2}$, which is fed to the tap coefficient calculating part 24 and 25. In the adaptive equalizer 23 the difference between the replica signal SRPL and the filtering signal SF, which is the input signal to the adaptive equalizer 23, is calculated by a subtractor 34 to generate an estimation error signal $\epsilon$. The absolute value of the estimation error signal $\epsilon$ is squared by a squarer 35, and the squared value $|\epsilon|^2$ is used as a branch metric in the Viterbi algorithm in the maximum likelihood sequence estimator 31. The most likely symbol pattern that is obtained with the Viterbi algorithm is output from the maximum likelihood sequence estimator 31 for decoding the received signal.

The input signal is received as burst signals, each of which has a frame configuration that starts with a training signal period, followed by a data period. To start with the calculation of each set of tap coefficients, a switch SW is driven to switch the input side of the replica generator 32 from the maximum likelihood estimator 31 to a training signal memory 36, from which a training signal $S_{TR}$ of a predetermined symbol sequence is provided to the replica generator 32. The tap coefficient calculating part 24 performs tap coefficient convergence processing by which the tap coefficients for the adaptive array antenna 10, that is, the tap coefficients of adaptive array antenna $W_{A1}$ to $W_{AL}$ corresponding to the multipliers $M_{A1}$ to $M_{AL}$, and the tap coefficients $W_{E1}$ to $W_{EM}$ for the adaptive equalizer 23 are converged from initial values in accordance with the propagation path conditions through the use of an estimation error signal of the replica signal $S_{RPL}$ for the received signal $S_F$ filtered during the reception of the training signal, the array antenna output signal $S_R$ and the tap input signal $S_{t2}$, that is, the training signal.

In this example, the tap coefficients $W_{E1}$ to $W_{EM}$ and $W_{A1}$ to $W_{AL}$ are converged in the training period so that the level of the estimation error signal, which is output from the adaptive equalizer 23, is reduced down to the lowest. In this case, the feed forward filter 22 is set to simply pass signals. This can be done by setting the tap coefficient of feed forward filter $W_{F1}$ corresponding to the first tap to 1 and the other tap coefficients $W_{F2}$ to $W_{FN}$ to 0s. The known LMS or RLS algorithm can be used for this convergence. Followings are operations for calculating the tap coefficients $W=\{W_{A1}$ to $W_{AL}, W_{E1}$ to $W_{EM}\}$ in the case of using the RLS algorithm.

$$X(i) = \frac{1}{\lambda} P(i-1) U(i) \quad (1)$$

$$K(i) = \frac{X(i)}{1 + U^H(i) X(i)} \quad (2)$$

$$W(i) = W(i-1) + K(i) \alpha^*(i) \quad (3)$$

$$P(i) = \lambda P(i-1) - K(i) X^H(i) \quad (4)$$

where $\lambda$ is a forgetting coefficient equal to or smaller than 1, $U(i)$ is a vector composed of tap input signals $S_R$ and $S_{t2}$, $P(i)$ is a correlation matrix of $U(i)$, and $\alpha^*(i)$ is representative of the estimation error signal $\epsilon$. And H represents a complex conjugate transpose. In order that all the tap coefficients will not become zero for the adaptive equalizer 23, one of the tap coefficients of adaptive equalizer $W_{E1}$ to $W_{EM}$ is fixed at 1 and the other remaining tap coefficients of adaptive equalizer are subjected to the convergence processing. As seen from equations (1) to (4), the tap coefficients are expressed by a recurrence relation. The tap coefficients W converges with a successive increase in the value i. Thus, the tap coefficients W can be obtained recursively by inputting the input signal and the estimation error.

The tap coefficient calculating part 25 performs tap coefficient convergence processing for the tap coefficients of feed forward filter $W_{F1}$ to $W_{FN}$ and the tap coefficients of adaptive equalizer $W_{E1}$ to $W_{EM}$ through the use of the estimation error signal $\epsilon$, the tap input signal $S_{t1}$ (the received signals $S_{i1}$ to $S_{iN}$) and the tap input signal $S_{t2}$ (the training signal $S_{TR}$). This convergence processing also uses Eqs. (1) to (4) to converge the tap coefficients $W_{F1}$ to $W_{FN}$ and $W_{E1}$ to $W_{EM}$ in the training signal period to minimize the level of the estimation error signal that is output from the adaptive equalizer 23. In this instance, P(i) is an inverse matrix of the correlation matrix of the tap input signals $S_{t1}$ which is provided from the feed forward filter 22 and the tap input signal $S_{t2}$ which is provided from the adaptive equalizer 23. In this calculation, the tap coefficients of adaptive array antenna $W_{A1}$ to $W_{AL}$ are fixed to the values that are calculated at the end of the tap coefficient convergence processing in the tap coefficient calculating part 24. The initial values of the tap coefficients of adaptive equalizer $W_{E1}$ to $W_{EM}$ can be converged fast by using the last computed values in the tap coefficient convergence processing.

The results of the convergence of the adaptive equalization coefficients $W_{E1}$ to $W_{EM}$ by the tap coefficient calculating part 24 are passed to the tap coefficient calculating part 25 for further convergence. Upon completion of the convergence by the tap coefficient calculating part 24, the tap coefficient select part 27 is switched temporally to the tap coefficient calculating part 25 side.

The receiving quality estimating part 26 first evaluates the magnitude of the estimation error signal that is output from the adaptive equalizer 23. Then, when the magnitude of the estimation error signal can be decided to be sufficiently small as compared with the received signal power, the estimating part 26 decides that the convergence of the tap coefficients has been completed, and outputs a receiving quality estimation signal that completes the tap coefficient convergence in the training signal period. In this case, the criterion of assessment or threshold value is chosen according to the propagation path conditions, for example, under −20 or −30 dB relative to the received signal power. That is, for example, when the SN ratio is relatively poor, there is a limit to reducing the estimation error signal. The receiving power can be substituted, for example, in the MLSE type equalizer of FIG. 4, with the output power of the replica generator 32. In a decision feedback type equalizer of FIG. 9, the receiving power needs only to be set at 1 since the tap coefficients are controlled so that the desired wave receiving power is 1.

On the other hand, when the estimation error signal is large and it is decided that the convergence of the tap coefficients is insufficient, the receiving quality estimating part 26 outputs a receiving quality estimating signal $S_Q$ instructing to perform the tap coefficient convergence processing again by the use of the training signal. The tap coefficient calculating part 24 and 25 respond to the signal $S_Q$ to carry out the tap coefficient convergence processing in the training signal period, again. At the time of repeating the tap coefficient convergence processing, the initial values of the tap coefficients of adaptive array antenna, tap coefficients of feed forward filter and tap coefficients of adaptive equalizer are the values calculated at the end of the previous tap coefficient convergence processing in the tap coefficient calculating part 24 and 25.

The above-described tap coefficient convergence processing by the tap coefficient calculating part 24 and 25 are repeated until it is decided that the tap coefficient convergence has been completed. The receiving quality estimating part 28 provides, as the receiving quality estimation signal, for example, (1, 0) for the tap coefficient convergence by the tap coefficient calculating part 24, (0, 1) for the tap convergence by the tap convergence calculating part 25, and (1, 1) for indicating the completion of the tap coefficient convergence processing. Accordingly, when the receiving quality estimation signal (1, 0) is provided from the receiving quality estimating part 26, the tap coefficient calculating part 24 starts processing and the tap coefficient calculating part 25 stops processing; when the receiving signal quality estimation signal (0, 1) is provided, the tap coefficient calculating part 24 stops processing and the tap coefficient calculating part 25 starts processing; and when the receiving quality estimation signal (1, 1) is provided, the tap coefficient calculating part 24 and 25 perform the tap coefficient calculating processing, using the symbol sequence candidate signals from the adaptive equalizer 23 for the data signal period.

The tap coefficient calculating part 24 and 25 repeat the tap coefficient convergence processing until the estimation error signal goes below the afore-mentioned criterion of assessment. In the embodiment of FIG. 1, storage part 29 is provided as a buffer. On a burst signal being received, demodulated outputs of L antenna element outputs from the demodulator 20 are stored in the storage part 29. For the tap coefficient convergence processing it is possible to repeatedly use the received training signal stored in the storage part 29. This avoids the necessity for using a training signal of a particularly long duration. Decode processing of the data period after the tap coefficient convergence processing is also carried out using the received signal stored in the storage part 29.

In the tap coefficient convergence processing by the tap coefficient calculating part 24 and 25, the training signal period may be split into two; the first half period is for the coefficient calculating part 24 and the second half period is for the coefficient calculating part 25. Alternatively, the training signal period may be split into four, in which case the four quarter periods are sequentially assigned to the coefficient calculating part 24 and 25 alternately with each other. At any rate, the coefficient convergence processing by the tap coefficient calculating part 25 is followed by deciding whether the magnitude of the estimation error signal has become smaller than the predetermined value, and the convergence processing by the coefficient calculating part 24 and 25 is repeated until the estimation error signal becomes smaller than the predetermined value.

When it is decided that the convergence has been completed, the input of the replica generator 32 (FIG. 4A) is switched to the maximum likelihood estimator 31, followed by starting the processing in the data signal period. Usually, temporal variations of the direction of incoming signals are slower than the temporal variations of the propagation path. Accordingly, in the data signal period the tap coefficients of adaptive array antenna $W_{A1}$ to $W_{AL}$ are fixed to the values calculated at the end of the tap coefficient convergence processing by the tap coefficient calculating part 24, and only the tap coefficients of feed forward filter $W_{F1}$ to $W_{FN}$ and the tap coefficients of adaptive equalizer $W_{E1}$ to $W_{EM}$ are updated, by which the temporal variations of the direction of incoming signals are made to follow the temporal variations of the propagation path. This is achieved by actuating only the tap coefficient calculating part 25. In the case where the transmission rate is sufficiently faster than the temporal variations of the propagation path, for example, when the transmission rate is tens of M symbols per sec, the tap coefficients updating by the tap coefficient calculating parts 24 and 25 are stopped and the tap coefficient at the end of the training period is used to perform the symbol demodulation in the data period. As the result of the above-described processing, the adaptive equalizer 23 outputs a decided symbol signal and the received signal is decoded accordingly.

Figure 5:
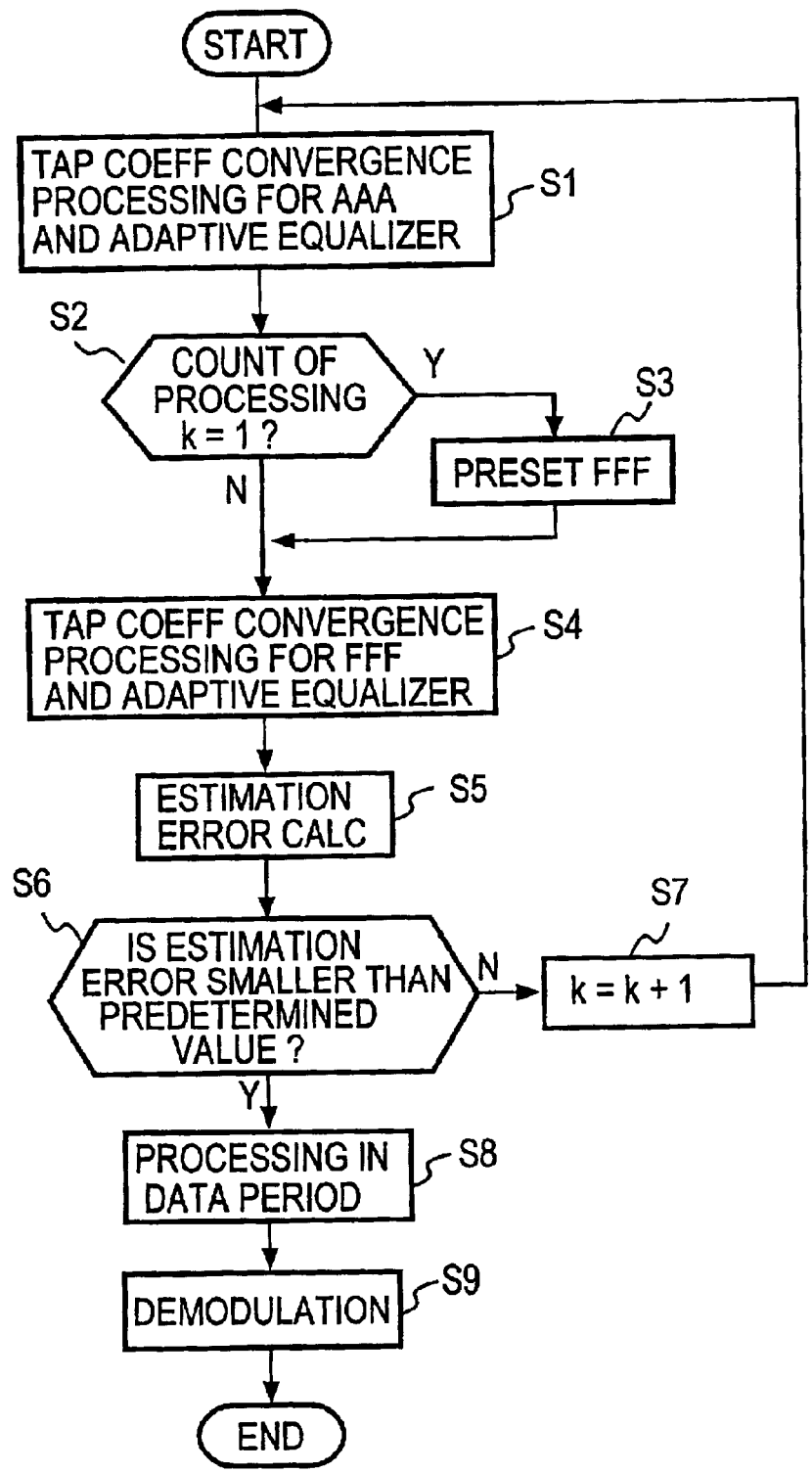
FIG. 5 is a flowchart showing a spatial and temporal equalization procedure according to the present invention.

FIG. 5 is a flowchart showing an example of the spatial and temporal equalization procedure of the first embodiment of the invention.

Step S1: For the received training signal period, the coefficient calculating part 24 performs convergence processing of the tap coefficients of adaptive array antenna $W_{A1}$ to $W_{AL}$ and the tap coefficients of adaptive equalizer $W_{E1}$ to $W_{EM}$ to minimize the estimation error signal level, using the training signal $S_{TR}$ as the tap input signal $S_{I2}$ from the training signal memory 36 (FIG. 4A), the estimation error signal ε from the subtractor 34 and the decoded training signal from the storage part 29. That is, the tap coefficient calculating part 24 performs the tap coefficient convergence processing for the adaptive array antenna 10 and the adaptive equalizer 23.

Step S2: A check is made to determine if the count of times of the convergence processing, k, by the tap coefficient calculating part 24 is k=1, that is, if the convergence processing is the first one.

Step S3: If so, the array antenna composite signal outputs so far are transferred to an empty feed forward filter 22.

Step S4: When the processing by the tap coefficient calculating part 24 is second or subsequent processing, the tap coefficient calculating part 25 performs convergence processing of the tap coefficients of feed forward filter $W_{F1}$ to $W_{FN}$ and the tap coefficients of adaptive equalizer $W_{E1}$ to $W_{EM}$ to minimize the estimation error signal level, using the signals $S_{i1}$ to $S_{iN}$ (FIG. 3) as the tap input signal $S_{t1}$ from the respective taps of the feed forward filter 22, the estimation error signal ε from the subtractor 34 and the training signal $S_{TR}$ as the tap input signal $S_{t2}$ from the training signal memory 36. That is, the tap coefficient calculating part 25 performs the tap coefficient convergence processing for the feed forward filter 22 and the adaptive equalizer 23.

Step S5: The tap coefficients after the convergence processing are set in the array antenna output combining part 28, the feed forward filter 22 and the replica generator 32 to calculate an estimation error.

Step S6: A check is made to determine if the calculated estimation error is smaller than a predetermined value.

Step S7: When the estimation error is larger than the predetermined value, the current number of counts, k, of processing is incremented by one, followed by a return to step S1, and steps S2 to S6 are repeated. If the estimation error signal is smaller than the predetermined value, the procedure goes to step S8.

Step S8: The tap coefficients are updated in the data signal period.

Step S9: Decoding is carried out in the data signal period.

Figure 6:
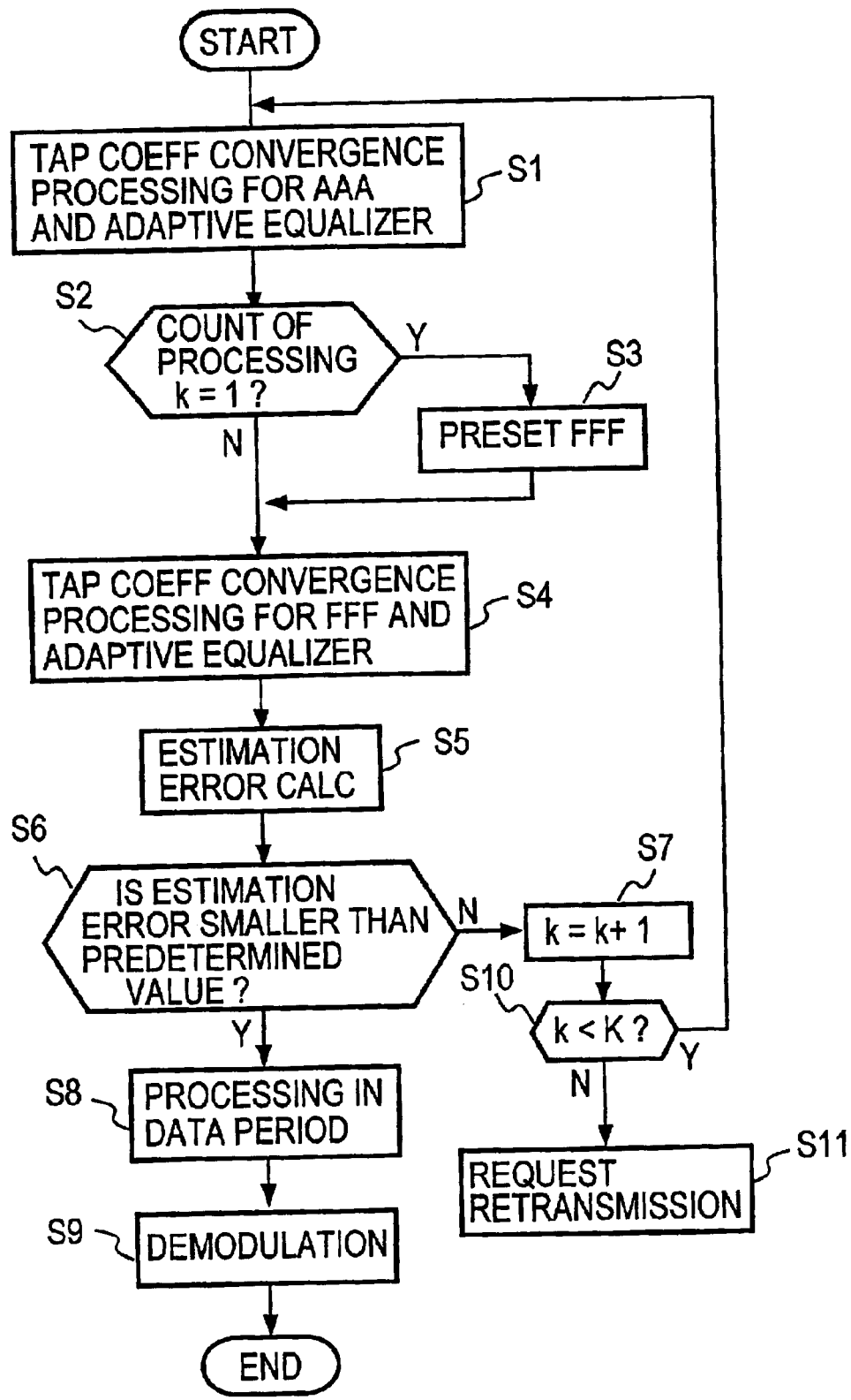
FIG. 6 is a flowchart showing a modification of the spatial and temporal equalization procedure of FIG. 5.

In the procedure of FIG. 5, when the estimation error does not become smaller than the predetermined value even after the convergence processing has been performed more than a predetermined number of times, that is, when the receiving quality remains low, it is possible to discard the received signal concerned and request the transmitting side to retransmit a signal. FIG. 6 shows the procedure to be followed in such a case. As shown, step S10 is provided after step S7 in FIG. 5 to determine whether the number of counts, k, of processing is smaller than the predetermined value K; if smaller, the procedure returns to step S1, and if not smaller, the procedure goes to step S11 to request the transmitting side to resend the signal.

Figure 7:
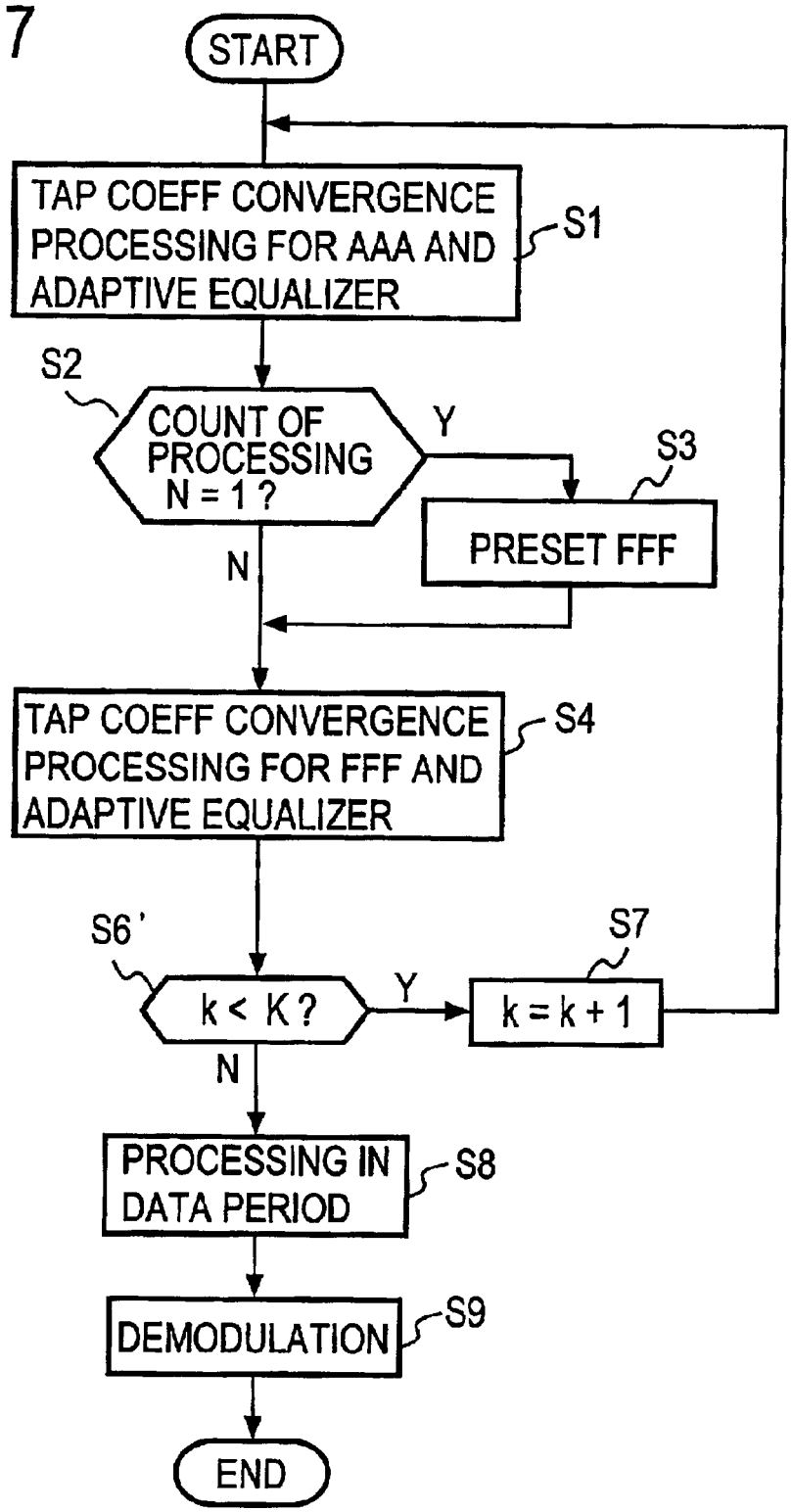
FIG. 7 is a flowchart showing another modification of the spatial and temporal equalization procedure of FIG. 5.

In the procedure of FIG. 5, instead of deciding in step S6 whether the estimation error is smaller than the predetermined value, it is possible to decide whether the convergence processing has been repeated a predetermined number of times K more than twice as shown by the step S6' in FIG. 7 and, if not, return to step S1 via step S7 and repeat the processing.

In the above embodiment, the same training signal can be used in the tap coefficient calculating part 24 and 25. In this instance, the training signal period of the demodulated signal stored in the storage part 29 is repeatedly used; the entire length of the training signal is shorter than in the case of using a different training signal in each tap coefficient calculating part. This is advantageous in terms of information transmission efficiency.

Second Embodiment

Usually, the symbol timing for demodulation is made to coincide with the timing of the leading wave of the received signal. In the MLSE type equalizer of FIG. 4A that achieves the most excellent receiving characteristic, the above-mentioned timing is taken as time 0 (i.e., current time point) and a replica signal is generated from a symbol candidates at time 0 and past or previous symbol candidates (−T, −2T, . . . ) for equalization.

However, when there is a synchronization error in the symbol timing regenerated at the demodulator side or when the receiving level of the delayed wave is remarkably higher than the receiving level of the leading wave, components of future symbols subsequent to the current symbol timing are contained as intersymbol interference in the received signal. Since such future symbol components are not contained in the replica signal that is generated in the equalizer, the estimation error increases and the receiving characteristic is degraded accordingly.

When the adaptive array antenna 10 is placed at the stage preceding the adaptive equalizer 23, delayed waves in which such future symbols are contained as intersymbol interference are regarded as interference components, and a directional pattern in which null is directed toward such delayed waves is formed by the adaptive array antenna 10. On this account, the desired signal components that are input to the adaptive equalizer 23 decreases as a whole, incurring the possibility that sufficient receiving characteristic cannot be obtained.

Figure 8:
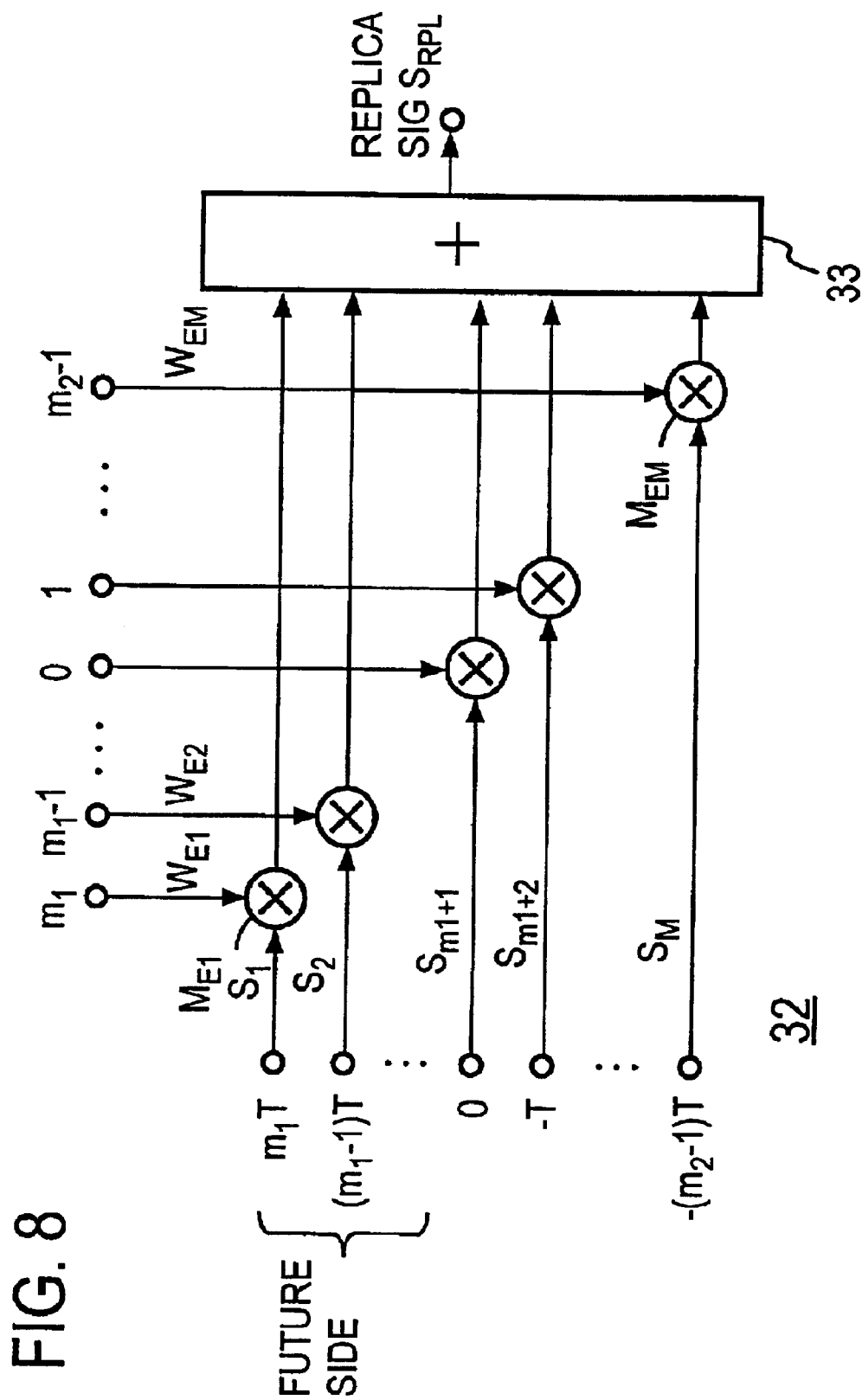
FIG. 8 is a diagram depicting a modified form of the replica generator 32 that is intended to generate a replica, taking into account future symbols as well.

FIG. 8 shows the configuration of a replica generator designed to prevent the deterioration of the receiving characteristic due to such symbol timing offset.

In the transversal filter forming the replica generator 32 of the FIG. 4B configuration in the first embodiment, the M taps are supplied with symbol candidates $S_1, S_2, \ldots, S_M$ corresponding to the time points in time 0, −T, −2T, . . . , −(M−1)T, respectively. In FIG. 8, M taps are supplied with symbol candidates $S_1, S_2, \ldots, S_M$ corresponding to the time points in time $+m_1T, \ldots, +T, 0, -T, -2T, \ldots, -(m_2-1)T$, then these symbol candidates are multiplied by M tap coefficients of adaptive equalizer $W_{E1}$ to $W_{EM}$ by M multipliers $M_{E1}$ to $M_{EM}$, respectively, and the multiplied outputs are added together by an adder 33 to obtain the replica signal $S_{RPL}$. In this case, $M=m_1+m_2$, where $m_1$ and $m_2$ are integers equal to or greater than one, and $m_1$ symbol candidates at the times T, 2T, . . . , $m_1T$ correspond to future signals.

In the initial tap coefficient convergence processing in the training signal period, the following procedure is used for signal processing.

(a) Converge the tap coefficients of the adaptive array antenna (AAA) 10 and the adaptive equalizer. In the replica generation by the adaptive equalizer, signal candidates are output for future symbols as well.

(b) Converge the tap coefficients of the feed forward filter (FF filter or simply FFF) 22 and the adaptive equalizer 23.

(c) Repeat steps (a) and (b).

The procedure for the received signal is generally identical with the procedure shown in FIG. 5 but differs from the latter in that signal candidates are provided for future symbols as well in the replica generation by the adaptive equalizer.

In the training signal period, the future symbol candidates can easily be generated since the symbol pattern is known. Further, according to this embodiment, even if symbol components at future time points are contained as intersymbol interference in the received signal, it is possible to generate the replica signal with accuracy and hence improve the receiving characteristic.

In this embodiment, in the case where the values of tap coefficients on the future side are found sufficiently small after step (a) and it is decided that there is no interference by the future symbols due to symbol timing offset, it is possible to stop containing the future symbols in the replica in the subsequent processing. This permits reduction of the computational complexity.

Moreover, in the case where the value of tap coefficients on the future side are found larger than a certain value after step (a) and it can be decided that there is interference by the future symbols due to symbol timing offset, it is possible to adjust the symbol timing to suppress the interference by the future symbols. It is also possible to perform step (a) after adjustment of the symbol timing; that is, it is possible to repeat the symbol timing adjustment and the step (a) until the value of the tap coefficients on the future side become sufficiently small.

On the other hand, since the feed forward filter 22 has a symbol timing offset adjustment capability, it is possible to automatically adjust the symbol timing offset in the feed forward filter 22 by excluding the future symbols from the replica generation by the adaptive equalizer. This eliminates the necessity for containing future symbols in the replica in the subsequent processing.

In the case of using the above scheme in the data period, since no future symbols have been determined, a plurality of symbol sequence candidates containing future symbols are present; but, by setting all symbol sequence candidates likely to be received as states, the above scheme can be used in the data period.

It would be difficult to constitute a trellis containing future symbols and perform the symbol sequence estimation. In this instance, however, it is possible to solve the problem by performing processing in which: the states related to future symbols also are taken into account only at the time of branch metric calculation for each symbol; the resulting increase in the number of states is not reflected in the trellis transition; and accordingly, the state transition related to the future symbols is not contained in the path history. That is, as regards the future symbols, decision processing for each symbol is carried out instead of performing the sequence estimation.

Third Embodiment

Figure 9:
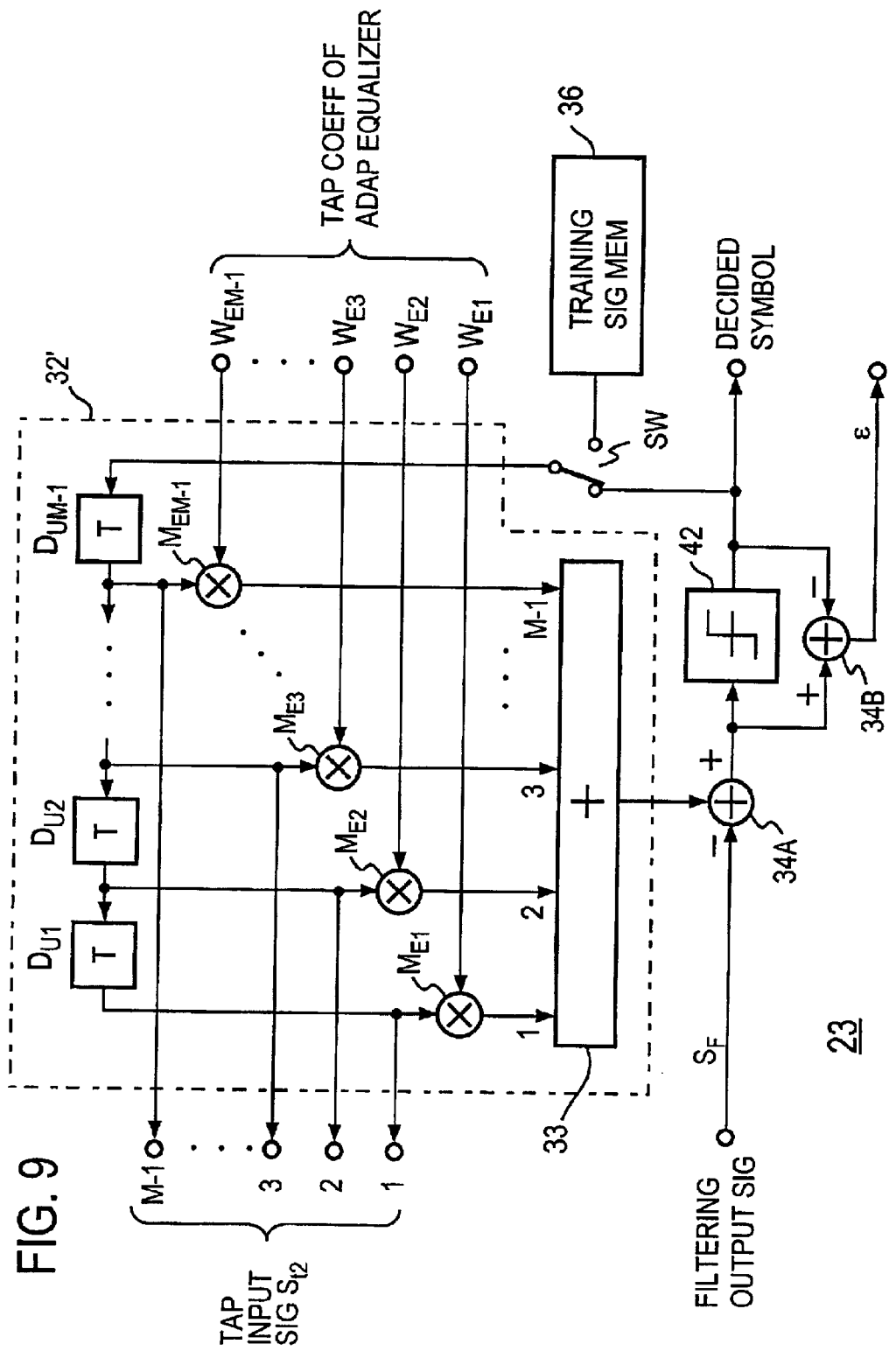
FIG. 9 is a diagram showing another example of the adaptive equalizer 23 in FIG. 1.

A decision feedback equalizer can be used as the adaptive equalizer 23 in the FIG. 1 embodiment. FIG. 9 illustrates an example of its configuration. In this instance, a fed-back version of the decided symbol signal is used in place of the symbol candidate signal used in the maximum likelihood estimation type equalizer. That is, a replica of delayed components of received symbols prior to the current received symbol is generated by a replica generator 32', then the replica of the delayed components is subtracted by an adder 34A from the filtering output signal (received signal) $S_F$ fed from the feed forward filter 22, and it is decided by a decision device 42 whether the output from the adder 34A is 1 or 0.

This decision result is output as a decoded symbol, and it is input to a series circuit of unit delay elements $D_{U1}$ to $D_{UM-1}$ each having a delay time of one symbol period T. The output signals from the delay elements $D_{U1}$ to $D_{UM-1}$ are complex-multiplied by tap coefficients of adaptive equalizer $W_{E1}$ to $W_{EM-1}$ by multipliers $M_{E1}$ to $M_{EM-1}$, respectively. The multiplied outputs are combined by the combiner 33, and the delayed components of the received symbols prior to the current one due to the propagation path are estimated, after which the combined output is provided to the subtractor 34A. That is, the replica of the delayed components of the received symbols preceding the current one is generated by the delay elements $D_{U1}$ to $D_{UM-1}$, the multipliers $M_{E1}$ to $M_{EM-1}$ and the combiner 33 that constitute the replica generator 32'. The output signals from the delay elements $D_{U1}$ to $D_{UM-1}$ are used as the tap input signal $S_{t2}$, which is applied to the tap coefficient calculating part 24 and 25 in FIG. 1. The difference between the input and output signals of the decision device 42 is calculated by a subtractor 34B and is used as the estimation error signal $\epsilon$.

Unlike the replica generator 32 in FIG. 4, the replica generator 32' in the FIG. 9 embodiment generates a replica using only symbols at previous points in time, that is, the outputs from the delay elements $D_{U1}$ to $D_{UM-1}$; the replica generator is shown to have M−1 taps only for the purpose of comparison with the case of FIG. 4, but this value has no particular meaning and the number of taps is arbitrary.

While in the embodiment of FIG. 1 the weighting of the adaptive array antenna is performed for the demodulated output, it may also be done for an RF signal. In such an instance, the signal to be input to the tap coefficient calculating part 24 needs to be demodulated separately. That is, in FIG. 1 the L demodulators 20 at the output side of the array antenna 20 are removed, one demodulator is connected to the output side of the array antenna output signal combining part 28 and L demodulators are inserted in the signal line from the array antenna 21 to the tap coefficient calculating part 24.

In this case, however, since the storage part 29 stores the RF signal, it is rather practical to split the training period than to repeatedly use the same training period.

The third embodiment of FIG. 9 may also be combined with the second embodiment of FIG. 8.

In the first, second and third embodiments, the array antenna output combining part 28 in FIG. 2, the feed forward filter 22 in FIG. 3, the replica generator 32 in FIGS. 4 and 8 and adaptive equalizer 23 in FIG. 9 each have been described to have multipliers of the same number as that of the tap coefficients and perform multiplying operations at the same time, but it is also possible to conduct the multiplying operations one after another by repeatedly actuating only one multiplier instead of using so many multipliers.

Effect of the Invention

The present invention permits implementation of a simple-structured spatial and temporal equalizer. Even if the tap coefficient calculation processing is performed for each of the adaptive array antenna, the feed forward filter and the adaptive equalizer, sufficient convergence of tap coefficients can be achieved without requiring significantly large computational complexity, and hence it is possible to attain the same level of receiving characteristic as is obtainable with a more complicated structure for batch processing.

What is claimed is:

1. A spatial and temporal equalizer comprising:
    an adaptive array antenna which complex-multiplies array antenna output signals from an array antenna composed of L elements by tap coefficients of adaptive array antenna to control the amplitudes and phases of received signals, and combines the multiplied output signals into an array antenna composite signal, said L being an integer equal to or greater than 2;
    a feed forward filter comprising a transversal filter of N taps respectively weighted by tap coefficients of feed forward filter, for receiving said array antenna composite signal and outputting signals of the N taps as a first tap input signal and a filtering output signal, said N being an integer equal to or greater than 2;

an adaptive equalizer which has a replica generator of M taps respectively weighted by tap coefficients of adaptive equalizer, outputs, as a second tap input signal, signals from the M taps of said replica generator supplied with symbol sequences, and outputs an estimation error signal for a received symbol based on the output from said adaptive equalization circuit and a decision symbol signal, said M being an integer equal to or greater than 1;

first tap coefficient calculating means for calculating said tap coefficients of adaptive array antenna and said tap coefficients of adaptive equalizer from said array antenna output signal, said second tap input signal and said estimation error signal;

second tap coefficient calculating means for calculating said tap coefficients of feed forward filter and said tap coefficients of adaptive equalizer from said first and second tap input signals and said estimation error signal;

tap coefficient select means for selectively outputting either said tap coefficients of adaptive equalizer from said first tap coefficient calculating means or said tap coefficients of adaptive equalizer from said second tap coefficient calculating means; and receiving quality estimating means for causing said first and second tap coefficient calculating means to repeat their convergence operation until it is estimated that the receiving quality has reached a desired level.

2. The spatial and temporal equalizer of claim 1, wherein said receiving quality estimating means is a means for deciding whether said receiving quality has reached a predetermined level by making a check to see if said estimation error signal is smaller than a predetermined value.

3. The spatial and temporal equalizer of claim 1, wherein said receiving quality estimating means is a means for deciding that said receiving quality has reached a predetermined level by repeating convergence operations of said first and second tap coefficient calculating means twice or a predetermined larger number of times.

4. The spatial and temporal equalizer of claim 1, wherein said replica generator comprises: M multipliers supplied with symbol sequences, for multiplying these symbols by said tap coefficients of adaptive equalizer, respectively; and a combiner for combining the multiplied outputs from said M multipliers to provide the combined output as a replica for said received symbols; and said adaptive equalizer comprises: a subtractor for outputting the difference between said filtering output signal and said replica as said estimation error signal; a maximum likelihood estimator for generating a symbol sequence candidate, for making a maximum likelihood estimation based on said estimation error signal to output a decision symbol; a training signal memory with a predetermined symbol sequence stored as a training signal; and a switch which selects said training signal read out of said training signal memory in a training signal period of a received signal, selects said symbol sequence candidate from said maximum likelihood estimator in a data signal period of said received signal and provides said selected symbol sequence candidate to said replica generator, and provides said selected symbol sequence candidate as said first tap input signal to said first and second tap coefficient calculating means.

5. The spatial and temporal equalizer of claim 4, wherein said maximum likelihood estimator generates, as said symbol sequence candidate, a symbol sequence composed of M symbols preceding the current point in time.

6. The spatial and temporal equalizer of claim 4, wherein let $m_1$ and $m_2$ be integers equal to or greater than 1, said maximum likelihood estimator generates, as said symbol sequence candidate, a symbol sequence composed of a total of M symbols including $m_1$ future symbols and $m_2$ symbols covering from current time point to a past time point.

7. The spatial and temporal equalizer of claim 1, wherein said replica generator comprises: a plurality of cascade-connected delay elements each having a delay time equal to a symbol period; a plurality of multipliers for multiplying the outputs from said delay elements by said tap coefficients of adaptive equalizer, respectively; a combiner for combining the outputs from said multipliers; a first subtractor for providing the difference between the output from said combiner and said filtering output signal; a decision device for deciding the level of the output from said first subtractor to output said decision symbol; a second subtractor for providing the difference between said decision symbol and said first subtractor output as said estimation error signal; a training signal memory for storing a training signal of a predetermined symbol sequence; and a switch which sequentially selects symbols of said training signal from said training signal memory in a training signal period of a received signal, selects said decision symbol in a data signal period of said received signal, and provides selected symbols to said cascade connection of said delay elements.

8. The spatial and temporal equalizer of any one of claims 4 to 7, wherein said adaptive array antenna comprises demodulators for demodulating received signals from said L-element array antenna, and array antenna output combining means which complex-multiplies the demodulated outputs from said demodulators by said tap coefficients of adaptive array antenna, combines the multiplied outputs into said array antenna composite signal.

9. The spatial and temporal equalizer of claim 8, which further comprises received signal storage means for temporarily storing the demodulated received signals of said demodulators, and wherein processing by said first and second tap coefficient calculating means is performed for demodulated signals read out of said received signal storage means.

10. The spatial and temporal equalizer of any one of claims 2 to 7, wherein said adaptive array antenna comprises array antenna output combining means for complex-multiplying received signal from said L-element array antenna by said tap coefficients of adaptive array antenna and for combining the multiplied outputs, and a demodulator for demodulating the combined output and for outputting the demodulated output as said array antenna composite signal.

11. The spatial and temporal equalizer of claim 10, which further comprises received signal storage means for temporarily storing received signals from said array antenna, and wherein processing by said first and second tap coefficient calculating means is performed for received signals ad out of said received signal storage means.

12. A spatial and temporal equalization method which compensates for symbol timing offset in the output from an adaptive array antenna having array antennas by a feed forward filter and makes a symbol decision by an adaptive equalizer, said method comprising the steps of:

(a) calculating tap coefficients of adaptive array antenna for the outputs from said array antennas and tap coefficients of adaptive equalizer for said adaptive equalizer based on received signals from said array antennas and a first tap input signal and an estimation error signal from said adaptive equalizer;

(b) calculating tap coefficients of feed forward filter for respective taps of said feed forward filter and said tap coefficients of adaptive equalizer for said adaptive equalizer from a second tap input signal provided from tap outputs of said feed forward filter, said first tap input signal and said estimation error signal;

(c) calculating an estimation error in said adaptive equalizer through the use of said tap coefficients of adaptive array antenna, said tap coefficients of feed forward filter and said tap coefficients of adaptive equalizer calculated by said steps (a) and (b); and (d) deciding whether said estimation error is smaller than a predetermined value, and if not smaller, repeating said steps (a) and (b).

13. A spatial and temporal equalization method which compensates for symbol timing offset in the output from an adaptive array antenna having array antennas by a feed forward filter and makes a symbol decision by an adaptive equalizer, said method comprising the steps of:

(a) calculating tap coefficients of adaptive array antenna for the outputs from said array antennas and tap coefficients of adaptive equalizer for said adaptive equalizer based on received signals from said array antennas and a first tap input signal and an estimation error signal from said adaptive equalizer;

(b) calculating tap coefficients of feed forward filter for respective taps of said feed forward filter and said tap coefficients of adaptive equalizer for said adaptive equalizer from a second tap input signal provided from tap outputs of said feed forward filter, said first tap input signal and said estimation error signal; and (c) deciding whether the number of repetitions of said steps (a) and (b) has reached a predetermined value larger than 2, and if not, repeating said steps (a) and (b).

14. The spatial and temporal equalization method of claim 12 or 13, wherein said steps (a) and (b) are steps of performing operations in first and second halves of a training signal period of a received signal.

15. The spatial and temporal equalization method of claim 12 or 13, which further comprises a step of storing a burstwise received signal in storage means, and wherein said steps (a) and (b) are steps of reading out the same training signal period of the received signal from said storage means and performing operations.

16. The spatial and temporal equalization method of claim 12 or 13, wherein: during the tap coefficient convergence processing in said step (a) said feed forward filter is set in its simply-passing state; and during the second tap coefficient convergence processing in said step (b) said tap coefficients of adaptive array antenna calculated in said step (a) are fixed, said tap coefficients of adaptive equalizer are set at initial values and said tap coefficients of feed forward filter and said tap coefficients of adaptive equalizer are calculated.

* * * * *